UNITED STATES PATENT OFFICE.

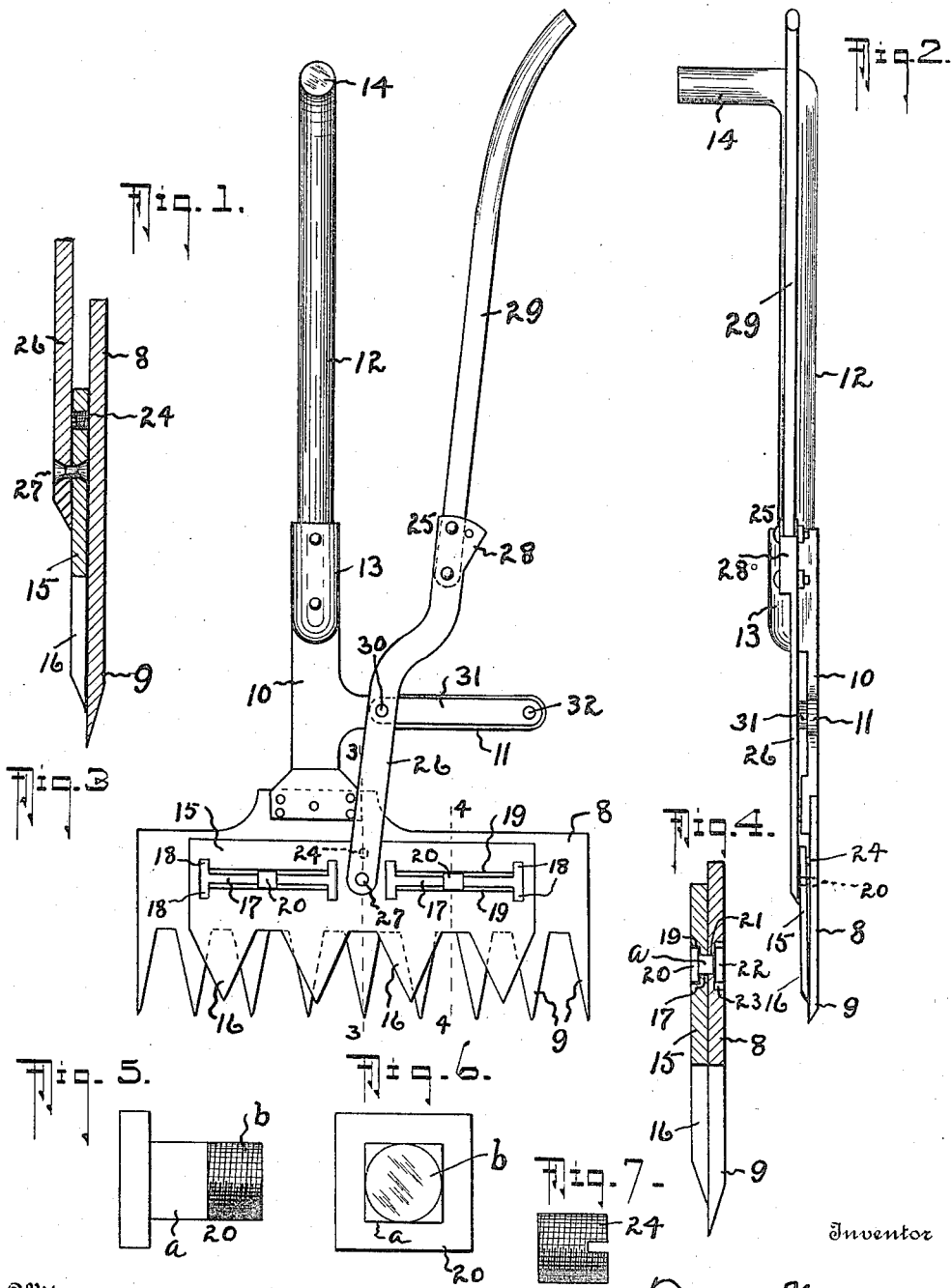

FREDERICK WIDOE, OF SOUTH OMAHA, NEBRASKA.

HAY-KNIFE.

1,165,737.  Specification of Letters Patent.  Patented Dec. 28, 1915.

Application filed March 17, 1915. Serial No. 15,058.

*To all whom it may concern:*

Be it known that I, FREDERICK WIDOE, a citizen of the United States, residing at South Omaha, in the county of Douglas and State of Nebraska, have invented certain new and useful Improvements in Hay-Knives, of which the following is a specification.

This invention relates to an improved hay knife, and has for its object, broadly, to provide an implement by means of which hay or straw, while compressed in the stack, may be cut to advantage, said implement to consist of parts which may be conveniently manufactured and assembled, and will be durable in use.

The invention includes means for making certain adjustments so that the blades will make a suitable contact, and has reference to novel features by means of which the knife may be directed to advantage for dividing or cutting the stack vertically, and to such a construction that the hay, while the knife is operated, will not become caught in the plates.

With the foregoing objects in view and others to be mentioned, the invention consists of the novel construction, combination and arrangement of parts as described herein and claimed, and as illustrated in the accompanying drawing, wherein,—

Figure 1 is a view in side elevation of the hay knife. Fig. 2 is a view taken at right angles to the view shown in Fig. 1. Fig. 3 is a transverse section through the plates and blades on line 3 3 of Fig. 1. Fig. 4 is a transverse section through the plates and blades on line 4 4 of Fig. 1. Figs. 5 and 6, respectively, are side and end views of an alining bolt. Fig. 7 is a side view of the adjusting screw.

Referring now to the drawing for a more particular description, numeral 8 indicates a supporting-plate substantially of rectangular form provided with convergent blades 9 opening upon its bottom, and, secured by any suitable means, upon the upper part of this plate, between its middle and one of its ends, is a casting or shank-member 10 provided with an arm 11 disposed in the plane of said plate, said casting, at its end, being provided with a socket 13 in which may be secured a handle 12 having a grip or hand-piece 14 which extends forwardly and overhangs the plate 8, and is disposed at right angles thereto.

Numeral 15 indicates a second rectangular plate formed at its bottom with outwardly convergent teeth 16. It is also provided, midway between its top and the teeth 16, with elongated apertures 17, said apertures being disposed in alinement parallel with the longitudinal axis of said plate and each being disposed midway between the middle and an end of said plate.

At 18 are indicated recesses, these being formed in pairs and disposed opposite to each other to open upon apertures 17, near the ends thereof, and said plate is provided with opposed recesses 19 which extend longitudinally thereof and open on apertures 17.

It will be understood that plate 15 may be disposed flatwise upon plate 8. A pair of keepers or screw-bolts are indicated at 20, each having a part *a* formed rectangular in cross-section for a mounting in an aperture 17 and an aperture 21 of plate 8, said apertures 21 being formed in the plate 8 at uniform distances from the ends thereof, the threaded ends *b* of the bolts being provided with nuts 22 seated in recesses 23 formed in the rear side of said plate, the heads of said bolts being seated in recesses 19 of the plate 15.

At 24, best shown in Figs. 3 and 7, is indicated an adjusting screw which is threaded in plate 15 midway between the ends of said plate and near its upper edge. The plate 15 has a lens length and width than that of plate 8, and it will be understood that member 15 may slide freely back and forth while maintained in connected relation by bolts 20, the heads of said bolts engaging in recesses 19. To cause these sliding movements, a hand lever 25 is provided, its lower end preferably consisting of a holder or connecting piece 26 pivotally mounted at its lower end, as indicated at 27, upon and approximately at the middle of plate 15, the upper end of said piece being provided with a socket 28 in which the extension 29 for the upper part of the lever may be adjustably mounted, said connecting-piece or holder having a pivotal mounting at 30 upon the inner end of link 31, the outer end of said link being pivoted at 32 upon the outer end of arm 11.

It will be noted that the screw 24 may be adjusted to cause the upper parts of the plates 8 and 15 to be disposed in spaced relation to cause the blades of the plates to closely approach or to make contact with each other, as may be desired, the heads of bolts 20 having a less thickness than the depth of recesses 19, and operating as fulcrums for this purpose; and this adjustment is useful when cutting hay or straw in any part of a stack which is wet, moist or mildewed.

The function discharged by recesses 18 is to permit hay or straw to enter therein from the elongated apertures 21, and which otherwise would accumulate at the ends of said apertures and would interfere with the slidable movements of plate 15, said accumulations being caused during the movements of the plate by the heads of bolts 20 when the ends of the apertures 21 are disposed adjacent thereto. The function discharged by recesses 19 is to permit the heads of bolts 20 to be disposed flush with the face of plate 15. Since the heads of the bolts are disposed in the plane of the plate, they will not be obtrusive to catch upon the hay or straw, during operation.

It will be noted that the plate 8 and the shank or casting 10 which is connected therewith, are disposed in alinement, the rectilinear handle 12 being disposed parallel and substantially in alinement therewith, and these features are of advantage for the purpose of causing a vertical cutting of the stack. In the use of the implement, an operator grasps the hand piece 14, and with the other hand may swing the lever in an arc the plane of which is parallel with the blades or plates, care being taken to maintain the implement in a vertical position, with the result that it will move downwardly, the blades causing the hay or straw to be cut in a vertical plane.

Having described the several parts, a further explanation relating to operation is not necessary.

While this description has been made in detail, it will be understood that changes may be made if desired or found to be of advantage, provided such changes are within the scope of the appended claims.

What I claim and desire to secure by Letters Patent is,—

1. In a hay knife, the combination of a rectangular toothed plate provided with a handle, a second rectangular toothed plate disposed flatwise upon the first named plate, a lever pivotally mounted upon one of said plates, a link having a pivotal mounting for one of its ends its opposite end being pivotally mounted upon said lever, one of said plates being provided with elongated apertures and having opposed recesses opening on the ends and longitudinal recesses opening on the sides of said apertures, and a pair of keepers, each being disposed in the plane of said plates in the longitudinal recesses of an elongated aperture.

2. In a hay knife, the combination of a rectangular toothed plate provided with a handle, a second rectangular toothed plate disposed upon the first named plate and provided with elongated apertures disposed in alinement, a lever adapted to have swinging movements while mounted upon the second plate, a link having a pivotal mounting for one of its ends, its opposite end being pivotally mounted on said lever, a screw-member threaded in one of the plates for a bearing upon the other plate to dispose parts of the plates in spaced relation, and a pair of keepers carried by the first named plate and engaging in the elongated apertures of the second plate.

In testimony whereof, I have affixed my signature in presence of two witnesses.

FREDERICK WIDOE.

Witnesses:
 HIRAM A. STURGES,
 ARTHUR H. STURGES.

Copies of this patent may be obtained for five cents each, by addressing the "Commissioner of Patents, Washington, D. C."